Patented Dec. 9, 1952

2,621,208

UNITED STATES PATENT OFFICE 2,621,208

HEXAHYDROPHENANTHRENE CARBOXYLIC ACID ESTERS AND PROCESS

Karl Miescher, Riehen, Jules Heer, Jean-René Billeter and Georg Anner, Basel, Switzerland, assignors to Ciba Pharmaceutical Products, Inc., Summit, N. J.

No Drawing. Application February 24, 1947, Serial No. 730,570. In Switzerland January 10, 1944

15 Claims. (Cl. 260—473)

This application is a continuation-in-part of our copending application Serial No. 542,812, filed June 29, 1944, now Patent No. 2,459,834.

The present invention relates to the preparation of tetrahydrophenanthrene carboxylic acids and derivatives thereof, and has particular relation to a process whereby the formation of active isomers is favored and the formation of inactive isomers is commensurately suppressed.

It has been found that the desired compounds can be prepared in the sense of the foregoing by proceeding according to the process of this invention which, briefly stated, is as follows:

A 1-oxo-1,2,3,4,9,10-hexahydrophenanthrene, which contains a functionally converted carboxyl group and a hydrocarbon radical in the 2-position, is first converted into the corresponding 1,2,3,4,9,10-hexahydrophenanthrene containing a hydrocarbon group in the 1-position in lieu of the keto group. This may be effected with the aid of a corresponding organometallic compound. The resulting reaction mixture which contains the formed 1-hydroxy-hexahydrophenanthrene compound and secondarily formed 1-alkylidene-hexahydrophenanthrene compound as well as some already-produced 1,2,3,4-tetrahydrophenanthrene compound may then be subjected to the action of dehydrating and isomerizing agents to convert the hexahydrophenanthrene compounds into 1,2,3,4-tetrahydrophenanthrene compounds. If desired, this conversion may be preceded by a separation of the hexahydrophenanthrene compounds from the reaction mixture. The resultant products may then be treated to convert into carboxyl a functionally converted carboxyl group which is in the 2-position, to convert into hydroxyl any substituent which is so convertible, and to hydrogenate non-aromatic multiple carbon bonds.

The starting compounds contain in 1-position a keto group and in 2-position a hydrocarbon radical, e. g. an alkyl-, such as methyl-, ethyl- or propyl- or an alkenyl-, e. g. allyl- group, as well as a functionally converted carboxyl group, e. g. a carbomethoxy-, carbethoxy-, carbobenzyloxy- or nitrile-group. In addition, they may also be substituted e. g. in 7-position by free hydroxyl groups or groups convertible thereinto. The latter may for example be hydroxyl groups etherified by means of methanol, ethanol, phenols, benzyl alcohols or the like, or they may be hydroxyl groups esterified with organic or inorganic acids, or they may be nitro- or aminogroups or halogen atoms.

In order to introduce a hydrocarbon radical, such e. g. as the methyl-, ethyl-, propyl-, benzyl- or ethinyl- group, into 1-position, the starting compounds may, according to the process of the invention, be reacted with a corresponding organo-magnesium- or zinc-halide, an alkyl- or alkinyl-alkali metal compound and the like. During the Grignard reaction, the initially formed condensation products are generally already appreciably dehydrated under the influence of the employed organometallic compound with formation of 1-alkylidene-1,2,3,4,9,10-hexahydrophenanthrenes. This reaction may therefore frequently result in reaction mixtures from which it is possible to separate, in addition to the expected 1-hydroxy- or 1-alkylidene-hexahydrophenanthrene derivatives, also the desired tetrahydrophenanthrene derivatives formed by dehydration and isomerization. By succeeding treatment with dehydrating and isomerizing agents, such 1-hydroxy- or 1-alkylidene-hexahydrophenanthrenes are also converted into tetrahydrophenanthrenes. For this, use may be made of the crude reaction mixtures or the isolated compounds. It has been found that in the case of the succeeding treatment, the formation of the physiologically active isomers is, surprisingly, highly favored.

In addition to the mentioned action of a Grignard reagent, the dehydration and isomerization may also be effected by treatment with water-eliminating agents such as more or less concentrated organic or inorganic acids or their anhydrides, e. g. formic acid, hydrochloric acid or phosphorus pentoxide, or by treatment with inorganic salts, e. g. zinc chloride or potassium bisulfate, or by means of bases, e. g. alkalies or alkaline earths such as sodium-, potassium-, or calcium-hydroxide; also by means of catalytic agents such as iodine or noble or base metal catalysts, e. g. platinum, palladium or chromium, their oxides or deposits on suitable carriers, alone or in the presence of solvents.

In the resultant products, the converted carboxyl group in 2-position and/or any other substituent which is convertible into a hydroxyl group may, in suitable cases, be converted respectively into a free carboxyl or hydroxyl group, in so far as this has not already taken place during the isomerization. Hydrolyzing agents may be used particularly for esters and ethers; for benzyl ethers e. g. it is however also possible to use reducing agents. On the other hand, saturation of non-aromatic carbon bonds, especially double or triple bonds introduced as a result of reaction with unsaturated organometallic compounds, may be effected by hydrogenation according to chemical or biochemical methods.

The products of the process are primarily useful as therapeutics or as intermediates.

The following examples set forth illustrative specific embodiments of the invention, but are to be regarded as only exemplary and not at all as limitative of the invention. In these examples, the relationship of "parts by weight" to "parts by volume" is the same as that of the kilogram to the liter.

*Example 1*

A Grignard solution, prepared from 8.1 parts by weight of magnesium and 36.6 parts by weight of ethyl bromide in 300 parts by volume of absolute ether, is run, at 0° C. and while stirring thoroughly, into a solution of 67 parts by weight of 7 - methoxy - 1 - oxo - 2 - carbomethoxy - 2 - methyl - 1,2,3,4,9,10 - hexahydrophenanthrene of Formula I

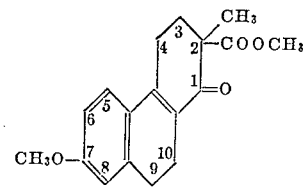

in 300 parts by volume of absolute benzene. The addition product is immediately precipitated as a bright yellow mass. After addition of 100 parts by volume of absolute ether, the mixture is boiled for ¼ hour under reflux. It is then cooled, decomposed with ice-cold ammonium chloride solution, and washed with water. After drying and evaporation of the solvent, 70 parts by weight of a bright yellow oil are obtained. The oil then is fractionally crystallized from methanol and yields the following fractions:

*Fraction A.*—Dense crystals of melting point 91–92° C. which are the 7-methoxy-1-hydroxy-1-ethyl - 2 - carbomethoxy - 2 - methyl - 1,2,3,4,9,-10-hexahydrophenanthrene of Formula II

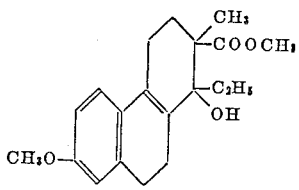

*Fraction B.*—This consists primarily of the 7-methoxy - 1 - ethylidene - 2 - carbomethoxy - 2 - methyl - 1,2,3,4,9,10 - hexahydrophenanthrene of Formula III

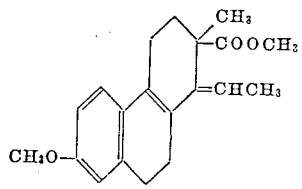

of melting point 146–147° C., together with a small quantity of the carbinol of melting point 91–92° C.;

*Fraction C.*—A partially oily product which may be separated by chromatography on aluminum oxide into the 7-methoxy-1-ethyl-2-carbomethoxy - 2 - methyl - 1,2,3,4 - tetrahydrophenanthrene of Formula IV

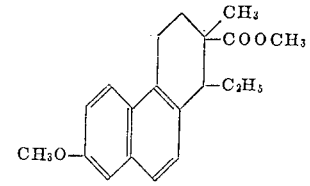

of the two dimorphous forms of melting point 116–117° C. (fine needles) and of melting point 112–114° C. (dense prisms), the latter being the more stable, and also into the 7-methoxy-1-ethyl-2 - carbomethoxy - 2 - methyl - 1,2,3,4-tetrahydrophenanthrene of melting point 75–76° C. and the previously described 7-methoxy-1-ethylidene-2 - carbomethoxy - 2 - methyl - 1,2,3,4,9,10 - hexahydrophenanthrene of melting point 146–147° C.

1 part by weight of 7-methoxy-1-hydroxy-1-ethly-2-carbomethoxy-2-methyl-1, 2, 3, 4, 9, 10-hexahydrophenanthrene of melting point 91–92° C. of Formula II is boiled for 1½ hours with 0.05 part by weight of iodine in 15 parts by volume of chloroform. The reaction mixture is poured into water, the iodine removed with sodium thiosulfate solution, and, after drying, the solvent evaporated. In order to saponify the carbomethoxy group, the residue is dissolved in a small quantity of alcohol and saponified at 170° C. in a potassium hydroxide melt. The crystallized acid which precipitates upon acidification of the alkaline solution of the saponification is recrystallized from acetone, the highly active 7-methoxy - 1 - ethyl - 2 - carboxy - 2 - methyl - 1, 2,3,4-tetrahydrophenanthrene of Formula V.

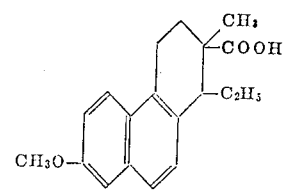

and melting at 228–230° C., being obtained. By heating to 170–180° C. with pyridine hydrochloride, the methoxy group is split with formation of the 7-hydroxy-1-ethyl-2-carboxy-2-methyl-1, 2, 3, 4-tetrahydrophenanthrene of melting point 204–205° C.

Splitting off of water and isomerization may also be effected with concentrated formic acid.

5 parts by weight of 7-methoxy-1-ethylidene-2-carbomethoxy-2-methyl-1, 2, 3, 4, 9, 10-hexahydrophenanthrene of melting point 146–147° C. of Formula III are fused with 2 parts by weight of palladium-charcoal and heated to 270–300° C. for ½ hour. After cooling, the bright yellow melt is dissolved in methanol, the catalyst is filtered off, and after concentrating the filtrate there is obtained the 7-methoxy-1-ethyl-2-carbomethoxy-2-methyl-1, 2, 3, 4,-tetrahydrophenanthrene of melting point 75–76° C. and of Formula IV, which is the methyl ester of the physiologically active methoxy-acid of melting point 228–230° C. and of formula V.

Other metals, their oxides or deposits on suitable carriers may also be used as isomerization catalysts.

*Example 2*

The crude bright yellow oil obtained analogously to Example 1 from 10 parts by weight of 7-methoxy-1-oxo-2-carbomethoxy-2-methyl-1, 2, 3, 4, 9, 10-hexahydrophenanthrene and the corresponding quantity of ethyl magnesium bromide, is boiled under reflux for 2 hours with 0.5 part by weight of iodine in 100 parts by volume of chloroform. The reaction mixture is first shaken with water and then with sodium thiosulfate solution, and the chloroform solution dried and evaporated. Saponification of the carbomethoxy group according to the procedure set forth in Example 1 leads to the 7-methoxy-1-ethyl-2-carboxy-2-methyl-1, 2, 3, 4-tetrahydrophenanthrene of melting point 228–230° C.; in addition, small quantities of the inactive isomer of melting point 204–205° C. may also be isolated.

By carrying out the Grignard reaction as described in Example 1, but subsequently boiling the addition product for a long time on the waterbath, there are likewise obtained—after working up the product and saponification of the carbomethoxy group—the two isomeric 7-methoxy-1-ethyl-2-carboxy-2-methyl-1, 2, 3, 4-tetrahydrophenanthrenes of melting point 228–230° C. and of melting point 204–205° C., the proportion of active product to inactive product being, however, less favorable.

*Example 3*

A suspension of 12.4 parts by weight of 7-methoxy-1-oxo-2-carbomethoxy-2-methyl-1, 2, 3, 4, 9, 10-hexahydrophenanthrene of formula 1 in 75 parts of volume of ether is added dropwise at —60° C. within a time period of 15 minutes into a sodium acetylenide solution, prepared from 1 part by weight of sodium, in 75 parts by volume of liquid ammonia. An additional 100 parts by volume of ether are then added, after 1 hour the ammonia is allowed to evaporate, and decomposition is then effected with aqueous ammonium chloride solution. The residue obtained from the washed, dried and evaporated ethereal solution amounts to 10.7 parts by weight and is the 7-methoxy - 1 - hydroxy - 1 - ethinyl - 2 - carbomethoxy-2-methyl-1, 2, 3, 4, 9, 10-hexahydrophenanthrene of Formula VI

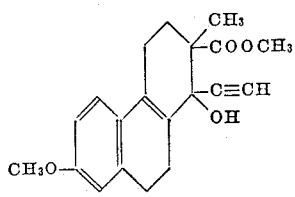

(VI)

which melts at 116–118° C.

In order to saturate the triple bond, 10 parts by weight of this carbinol are dissolved in 200 parts by volume of ethanol and are hydrogenated in presence of 0.5 part by weight of platinum oxide. After the absorption of 2 mols of hydrogen, the hydrogenation ceases. Working up proceeds as hereinbefore described and the 7-methoxy - 1 - hydroxy - 1 - ethyl - 2 - carbomethoxy-2-methyl-1, 2, 3, 4, 9, 10-hexahydrophenanthrene of Formula II and of melting point 91–92° C. is isolated in quantitative yield. Treatment with iodine, followed by saponification leads, as described in Example 1, to the 7-methoxy-1-ethyl-2-carboxy-2-methyl-1, 2, 3, 4-tetrahydrophenanthrene of melting point 228–230° C.

Analogous compounds are obtained by using starting compounds with other similar substituents e. g. in 2- or 7-position and treating these with suitable organometallic compounds.

*Example 4*

4.9 parts by weight of 7-methoxy-1-oxo-2-carbomethoxy-2-methyl-1,2,3,4,9,10 - hexahydrophenanthrene of Formula I, dissolved in 75 parts by volume of benzene, are reacted at about 0° C. with a Grignard solution, obtained from 0.6 part by weight of magnesium, 3.5 parts by weight of methyl iodide and 75 parts by volume of ether. The reaction mixture is then boiled on the waterbath and after cooling is decomposed with ice and sulfuric acid. The ether-benzene solution, washed with water and dried, leaves after evaporation a yellow oil. This is dissolved in 100 parts by volume of chloroform, 0.5 part of iodine is added, and the mixture boiled for 1½ hours under reflux. It is then worked up according to Example 2 and the carbomethoxy group saponified. After recrystallization from acetone, there is obtained the 7-methoxy-1,2-dimethyl-2-carboxy-1,2,3,4-tetrahydrophenanthrene of Formula VII. It melts at 228° C.

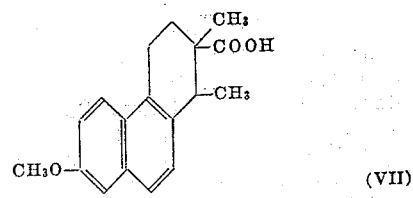

(VII)

*Example 5*

1 part by weight of 7-methoxy-1-ethylidene-2-carbomethoxy - 2-methyl-1,2,3,4,9,10-hexahydrophenanthrene of melting point 146–147° C. and Formula III is heated with 5 parts by weight of potassium hydroxide and 12 parts by volume of methanol in a closed iron tube for 5 hours at about 200° C. After cooling, the tube contents are poured into water, extracted with ether, and the acid mixture precipitated from the alkaline solution by means of hydrochloric acid. This is dissolved in acetone, 0.6 part by volume of saturated soda solution added, the acetone evaporated and the remaining sodium salt dissolved in 6 parts by volume of water. Into this solution, carbon dioxide gas is introduced during a considerable length of time. The thus precipitated acid is then filtered off. The filtrate yields, after treatment with hydrochloric acid, the 7-hydroxy-1 - ethyl-2-carboxy-2-methyl-1,2,3,4-tetrahydrophenanthrene of Formula VIII and of melting point 204° C., recrystallized from ethyl acetate. The filter residue is the isomeric 7-hydroxy-1-ethyl-2-carboxy-2-methyl-1,2,3,4 - tetrahydrophenanthrene of Formula VIII and of melting point 238–240° C. (after crystallization from methanol).

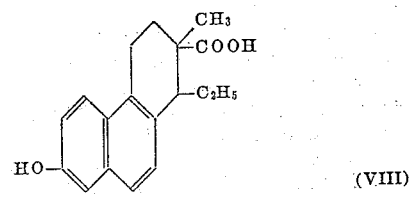

(VIII)

*Example 6*

1 part by weight of 7-methoxy-1-ethylidene-2-carbomethoxy-2-methyl-1,2,3,4,9,10 - hexahydrophenanthrene of 146–147° C. and Formula III is heated for 3 hours to about 170° C. with 10 parts by weight of pyridine hydrochloride. The cooled melt is shaken out with ether and hydrochloric acid. The residue obtained after evaporation of the ether is recrystallized from ether. Thus are obtained 0.8 part by weight of 7-hydroxy-2-carboxylic acid methyl ester of melting point 187–190° C. This product is then heated in a mixture of 2.5 parts by weight of potassium hydroxide, 10 parts by weight of ethyl alcohol and 1 part by weight of water to about 170° C. in an open vessel. After cooling, it is diluted with water, shaken out with ether, and the free hydroxy-acid obtained from the alkaline solution by treatment with hydrochloric acid. It is recrystallized from ethyl acetate and is the active 7 - hydroxy -1- ethyl-2-carboxy-2-methyl-1,2,3,4-tetrahydrophenanthrene of Formula VIII and of melting point 204° C. The isomeric acid VIII of melting point 238–240° C. can also be isolated from the mother liquor.

*Example 7*

2.5 parts by weight of 7-methoxy-1-hydroxy-1 - ethyl - 2-carbomethoxy-2-methyl-1,2,3,4,9,10-hexahydrophenanthrene of melting point 91–92° C. are dissolved in 50 parts by volume of concentrated formic acid, whereby a brown solution is obtained. By heating the mixture on a water bath the color of the solution slowly becomes dark green. After 1 hour the whole is poured on to ice and the organic material is extracted with ether. By evaporating the solvent a yellow oil is obtained which is hydrolyzed by means of a mixture of 6 parts by weight of potassium hydroxide, 2 parts by volume of water and 10 parts by volume of ethyl alcohol at about 170° C. The cooled mixture is then poured into water and by acidifying with diluted hydrochloric acid the free acid is formed, which is recrystallized from methanol. After several recrystallizations the two isomeric 7-methoxy-1-ethyl-2-carboxy-2-methyl-1,2,3,4-tetrahydrophenanthrenes of the Formula V and of melting point 228–230° C. and 204–205° C., respectively, are obtained.

*Example 8*

6.5 parts by weight of 7-hydroxy-1-oxo-2-carbomethoxy - 2 - methyl - 1,2,3,4,9,10 - hexahydrophenanthrene [obtained by reacting γ-(6-hydroxy - 2 - carbomethoxy - 3,4-dihydronaphthyl-(1))-butyric acid methyl ester with a benzyl halide, condensing the so formed 7-benzyl-ether by means of an alkali methoxide to the 7-benzyloxy - 1-oxo-2-carbomethoxy-1,2,3,4,9,10-hexahydrophenanthrene, methylating the latter to the 2-methyl derivative and splitting off the benzyl radical by hydrogenation of the 7-benzyloxy-1-oxo-2-carbomethoxy-2-methyl-1,2,3,4,9,10-hexahydrophenanthrene] are reacted at about 0° C. with a Grignard solution, prepared from 1.2 parts by weight of magnesium, 4 parts by volume of ethyl bromide and a mixture of 150 parts by volume of ether and 150 parts by volume of benzene. The reaction mixture is warmed for ½ hour on a water bath and then cooled and decomposed with ice-cold diluted hydrochloric acid. After drying and evaporation 6.5 parts by weight of a crude yellow oil are obtained, which are hydrolyzed by heating the crude product to about 170° C. in a mixture of 15 parts by weight of potassium, 3 parts by volume of water and 30 parts by volume of ethyl alcohol. The alkaline solution obtained by pouring the melt into water is acidified with hydrochloric acid and the semisolid acid is extracted with ether. The residue of the evaporated ether solution is fractionally crystallized from ethyl acetate. In this way the two isomeric 7-hydroxy-1-ethyl-2-carboxy-2-methyl-1,2,3,4-tetrahydrophenanthrenes of the Formula VIII and of melting point 204° C. and 238–240° C., respectively, are obtained.

*Example 9*

8 parts by weight of 7-methoxy-1-oxo-2-carbomethoxy - 2 - methyl - 1,2,3,4,9,10 - hexahydrophenanthrene are added all at once to a Grignard solution prepared from 1 part by weight of magnesium in 80 parts by volume of absolute ether and 12 parts by weight of ethyl bromide. The mixture is then heated for some time under reflux, and the product of the reaction decomposed by cooling with ice-cooled ammonium chloride solution. The product obtained is dissolved in plenty of ether, washed with dilute hydrochloric acid and water, and the ethereal solution evaporated down in vacuo.

1 part by weight of this residue is boiled under reflux for three hours with 10 parts by volume of chloroform and 0.1 part by weight of iodine. The reaction mixture is then shaken with water and a solution of sodium thiosulfate, and the chloroform layer is dried and evaporated. The crude product so obtained is hydrolyzed by heating it in a mixture of 10 parts by volume of methanol and 5 parts by weight of potassium hydroxide at about 200° C. in a sealed tube for 4–5 hours. After cooling diluted hydrochloric acid is added and the acid is taken up in ether. By evaporation crude 7-hydroxy-1-ethyl-2-carboxy - 2 - methyl-1,2,3,4-tetrahydrophenanthrene of the Formula VIII is obtained. It melts after recrystallization from ethyl acetate at 204° C. and produces full oestrus in castrated rats with only 0.1–0.2γ, administered by mouth.

Having thus described the invention, what is claimed is:

1. A process of the character described, which comprises reacting a 1-oxo-1,2,3,4,9,10-hexahydrophenanthrene which contains an esterified carboxyl group and a lower alkyl radical in 2-position, with a metallo-lower-aliphatic-hydrocarbon compound and with a hydrolyzing agent and then treating the product obtained with a dehydrating agent under energetic conditions whereby isomerization is brought about.

2. A process of the character described which comprises reacting a 1-oxo-1,2,3,4,9,10-hexahydrophenanthrene which contains an esterified carboxyl group and a lowered alkyl radical in the 2-position, with a metallo-lower-aliphatic hydrocarbon compound and with a hydrolyzing agent, treating the product obtained with a dehydrating agent under energetic conditions whereby isomerization is brought about, and then saturating any non-aromatic multiple bonds which are present in the products by the action of hydrogen.

3. A process of the character described, which comprises reacting a 1-oxo-1,2,3,4,9,10-hexahydrophenanthrene which contains an esterified carboxyl group and a lower alkyl radical in the 2-position, with a lower alkyl-substituted metal halide whereby a mixture containing the corresponding 1-lower-alkyl-1-OH-1,2,3,4,9,10-hexahydrophenanthrene and the corresponding 1-alkylidene - 1,2,3,4,9,10 - hexahydrophenanthrene compounds is produced, and then converting the said 1-lower-alkyl-1-OH- and 1-lower-alkylidene-1,2,3,4,9,10-hexahydrophenanthrene compounds into the corresponding 1,2,3,4-tetrahydrophenanthrene compounds by the action of a dehydrating agent under energetic conditions whereby isomerization is brought about.

4. A process of the character described, which comprises reacting a 1-oxo-1,2,3,4,9,10-hexahydrophenanthrene which contain an esterified carboxyl group and a lower alkyl radical in the 2-position, with a lower alkyl-substituted metal halide whereby a mixture containing the corresponding 1-lower-alkyl-1-OH-1,2,3,4,9,10-hexahydrophenanthrenes, the corresponding 1-lower-alkylidene - 1,2,3,4,9,10-hexahydrophenanthrenes and the corresponding 1,2,3,4-tetrahydrophenanthrenes is produced, separating the said hexahydrophenanthrenes from the tetrahydrophenanthrenes and converting the separated hexahydrophenanthrenes into the corresponding 1,2,3,4-tetrahydrophenanthrenes by the action of a dehydrating agent under energetic conditions whereby isomerization is brought about.

5. A process of the character described, which comprises reacting a 1-oxo-1,2,3,4,9,10-hexahydrophenanthrene which contains an esterified carboxyl group and a lower alkyl radical in the 2-position, with an alkinyl-alkali metal compound whereby the corresponding 1-alkinyl compound is produced, saturating the alkinyl group by the action of hydrogen, and then converting the latter into the corresponding 1,2,3,4-tetrahydrophenanthrene compound by the action of a dehydrating agent under energetic conditions whereby isomerization is brought about.

6. A process of the character described, which comprises reacting a 1-oxo-1,2,3,4,9,10-hexahydrophenanthrene which contains an esterified carboxyl group and a lower alkyl radical in the 2-position, with a lower alkyl-substituted metal halide whereby a mixture containing the corresponding 1-lower-alkyl-1-OH-1,2,3,4,9,10-hexahydrophenanthrene and the corresponding 1-lower - alkylidene-1,2,3,4,9,10-hexahydrophenanthrene compounds is produced, converting the said 1-lower-alkyl-1-OH- and 1-lower-alkylidene-1,2,3,4,9,10 - hexahydrophenanthrene compounds into the corresponding 1,2,3,4-tetrahydrophenanthrene compounds by the action of a dehydrating agent under energetic conditions whereby isomerization is brought about, and then converting the esterified carboxyl group in the 2-position into a free carboxyl by the action of a hydrolyzing agent.

7. A process of the character described, which comprises reacting a 1-oxo-1,2,3,4,9,10-hexahydrophenanthrene which contains an esterified carboxyl group and a lower alkyl radical in the 2-position and contains a group which is convertible into hydroxyl in the 7-position, with a lower alkyl-substituted metal halide whereby a mixture containing the corresponding 1-loweralkyl-1-OH-1,2,3,4,9,10 - hexahydrophenanthrene and the corresponding 1-lower-alkylidene-1,2,3,-4,9,10-hexahydrophenanthrene compounds is produced, converting the said 1-lower-alkyl-1-OH- and 1 - lower-alkylidene-1,2,3,4,9,10-hexahydrophenanthrene compounds into the corresponding 1,2,3,4-tetrahydrophenanthrene compounds by the action of a dehydrating agent under energetic conditions whereby isomerization is brought about, and then converting the esterified carboxyl group in the 2-position into a free carboxyl and the group in 7-position into a free hydroxyl by the action of a hydrolyzing agent.

8. A process of the character described, which comprises reacting the 7-methoxy-1-oxo-2-carbomethoxy - 2 - methyl - 1,2,3,4,9,10 - hexahydrophenanthrene with an ethyl-substituted metal halide and with a hydrolyzing agent and then treating the product obtained with a dehydrating agent under energetic conditions whereby isomerization is brought about.

9. In a process of the character described, the step which comprises treating a member selected from the group consisting of 7-alkoxy-1-hydroxy-1,2-dialkyl-2-carbalkoxy-1,2,3,4,9,10 - hexahydrophenanthrenes and 7-alkoxy-1-alkylidene-2-carbalkoxy-2-alkyl - 1,2,3,4,9,10 - hexahydrophenanthrenes, wherein the alkyl groups are lower alkyl groups and the alkylidene is lower alkylidene, with a dehydrating agent under energetic conditions whereby isomerization is brought about.

10. The process defined in claim 1, wherein the dehydrating agent is iodine.

11. The process defined in claim 1, wherein the dehydrating agent is a metal catalyst.

12. The process defined in claim 1, wherein the dehydrating agent is an alkali hydroxide.

13. A 1,2,3,4,9,10-hexahydrophenanthrene containing in 2-position an esterified carboxyl group and in 1-position a member selected from the group consisting of hydroxy and lower alkyl radicals and lower alkyl radicals which are attached to the 1-position by a double bond.

14. The 7-methoxy-1-hydroxy-1-ethyl-2-carbomethoxy-2-methyl-1,2,3,4,9,10-hexahydrophenanthrene.

15. The 7-methoxy-1-ethylidene-2-carbomethoxy - 2 - methyl - 1,2,3,4,9,10 - hexahydrophenanthrene.

KARL MIESCHER.
JULES HEER.
JEAN-RENÉ BILLETER.
GEORG ANNER.

REFERENCES CITED

The following references are of record in the file of this patent:

Heer et al., Helv. Chim. acta 28, pp. 1506–1521 (1945).

Hunter: Jour. Am. Chem. Soc. 68, 1676–1677 (1946).